United States Patent
Belling

(10) Patent No.: US 12,289,177 B2
(45) Date of Patent: Apr. 29, 2025

(54) SELECTING INGRESS NODE FOR A MULTICAST DISTRIBUTION SESSION

(71) Applicant: NOKIA TECHNOLOGIES OY, Espoo (FI)

(72) Inventor: Horst Thomas Belling, Erding (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 358 days.

(21) Appl. No.: 17/790,883

(22) PCT Filed: Dec. 31, 2020

(86) PCT No.: PCT/US2020/067659
§ 371 (c)(1),
(2) Date: Jul. 5, 2022

(87) PCT Pub. No.: WO2021/138555
PCT Pub. Date: Jul. 8, 2021

(65) Prior Publication Data
US 2022/0376937 A1    Nov. 24, 2022

Related U.S. Application Data

(60) Provisional application No. 62/956,836, filed on Jan. 3, 2020.

(51) Int. Cl.
*H04L 12/18*    (2006.01)
*H04L 67/141*    (2022.01)

(52) U.S. Cl.
CPC .......... *H04L 12/189* (2013.01); *H04L 12/185* (2013.01); *H04L 67/141* (2013.01)

(58) Field of Classification Search
None
See application file for complete search history.

(56) References Cited

U.S. PATENT DOCUMENTS

2007/0091827 A1 *  4/2007  Boers ................... H04L 12/185
                                                         370/255
2018/0367604 A1    12/2018  Kodaypak

FOREIGN PATENT DOCUMENTS

WO    2019/136128 A1    7/2019

OTHER PUBLICATIONS

Communication pursuant to Article 94(3) EPC dated Apr. 26, 2023, corresponding to European Patent Application No. 20848924.5.
International Search Report and Written Opinion corresponding to International Patent Application No. PCT/US2020/067659, dated Mar. 18, 2021.
Communication pursuant to Article 94(3) EPC dated Feb. 6, 2024 corresponding to European Patent Application No. 20848924.5.

* cited by examiner

*Primary Examiner* — Minh Trang T Nguyen
(74) *Attorney, Agent, or Firm* — SQUIRE PATTON BOGGS (US) LLP

(57) ABSTRACT

Systems, methods, apparatuses, and computer program products for selecting the ingress node for a multicast distribution session are provided. One method may include receiving a request to join a multicast session, and checking a database to determine whether an ingress node for the multicast session has already been assigned or configured to handle a corresponding multicast distribution session by passing received data towards radio nodes within the multicast distribution session.

12 Claims, 5 Drawing Sheets

SELECTING INGRESS NODE FOR A MULTICAST DISTRIBUTION SESSION

CROSS-REFERENCE TO RELATED APPLICATIONS

This application claims priority from U.S. provisional patent application No. 62/956,836 filed on Jan. 3, 2020. The entire contents of this earlier filed applications are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for selecting an ingress node for a multicast distribution session(s).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment is directed to a method that may include receiving a request to join a multicast session. The method may also include checking a database to determine whether an ingress node for the multicast session has already been assigned and/or configured to handle the corresponding multicast distribution session by passing received data towards radio nodes within the multicast distribution session.

In a variant, when it is determined that an ingress node has been assigned and configured, the method may include configuring a user plane handling component of the assigned ingress node for incoming data for the multicast session to one or more upstream nodes towards the radio networks. In certain embodiments, the user plane handling component may be a separate node such as a user plane function (UPF) from the control part of the ingress node in a so-called split architecture.

According to a variant, if it is determined that an ingress node has been assigned but not configured, then the assigned ingress node may be configured to handle the multicast distribution session.

In a variant, if it is determined that an ingress node has not been assigned or configured, then an ingress node may be assigned and the assigned ingress node may be configured to handle the multicast distribution session.

According to a variant, once an ingress node is assigned and configured, the ingress node may configure its user plane handling component for incoming data for the multicast session to one or more upstream nodes towards the radio networks.

In a variant, the multicast session may be identified, for example, via an IP address and port, such as a multicast IP address.

According to a variant, the method may include sending requests to upstream nodes such, as RAN nodes, to handle the multicast distribution session and reserve corresponding user plane resources.

In a variant, the method may include checking, for each multicast session, which RAN node(s) are to receive the multicast distribution sessions and providing a database entry indication for that multicast session indicating the RAN node(s) required.

In a variant, the method may include updating the database entry when RAN node(s) need to be added or removed. According to certain variants, the RAN node(s) may include AMF(s).

In another variant, the lists of RAN nodes per SMF may be directly stored in the ingress node handling the multicast distribution session. In this embodiment, the method may include directly informing that node when SMFs are added or removed.

In some variants, the method may include assigning the ingress node to handle a multicast distribution session when an external AF sends a request to reserve resources for the corresponding multicast session. In a variant, the request of the AF may be handled by a network exposure function (NEF). In this variant, the NEF may select a node to handle a multicast distribution session and may send a request to that node to reserve resources to handle that multicast distribution session and possibly to assign an address (e.g., IP address and port) where to receive data for that multicast distribution session. In a variant, the NEF may also store information about the node assigned to handle the multicast distribution in the database. According to a variant, if the node assigned an address, the NEF may forward that address to the AF.

An embodiment is directed to a method that may include storing, at a database, information on which node(s) serve as ingress point to PLMN's core network for a multicast session. The method may also include, for example responsive to a request to join the multicast session received by an SMF, providing information to the SMF whether an ingress node has been assigned and configured to handle the multicast session.

In a variant, the method may also include storing, along with the information on which nodes serve as ingress nodes for multicast sessions, information on the RAN node(s) that should receive the multicast session.

According to a variant, the method may also include receiving, at the database, an indication from the SMF of the RAN node(s) required by the SMF for the multicast session and optionally receiving updates when a RAN node needs to be added or removed.

In a variant, the method may also include storing separate RAN node lists per SMF and/or optionally storing a combined list of all RAN node(s) required by any SMF towards the ingress node configured to handle the multicast session.

According to a variant, the method may include providing the combined list of RAN node(s) required by an SMF to the ingress node configured to handle the multicast session and, when a RAN node is added or removed from the combined list, notifying the ingress node of the change to the combined list.

In one variant, the database may be a UDR or UDM, for example.

An embodiment is directed to a method that may include receiving, by an ingress node, a configuration to handle a multicast distribution session. The method may also include the ingress node configuring its user plane handling component for incoming data for the multicast distribution session to one or more upstream nodes towards the radio networks.

In one variant, the user plane handling component may be a separate node, such as a UPF, from the control part of the ingress node. According to a variant, the upstream node(s) may include, RAN node(s) such as UPF(s) controlled by AMFs.

According to a variant, the method may include transmitting requests to the upstream node(s) (e.g., RAN node(s)) to handle the multicast distribution session and reserve corresponding user plane resources.

In a variant, the method may include assigning an address (e.g., IP address and/or port) for where to receive data for the multicast distribution session.

According to a variant, the method may include receiving the combined list of RAN node(s) required by an SMF from a database.

According to some variants, when a RAN node is added or removed from the combined list, the method may include receiving a notification, from the database, of the change and optionally updating the configuration of the user plane handling component and/or sending a request to an added RAN node to handle the multicast distribution session and/or sending a request to a removed RAN node to terminate the handling of that multicast distribution session.

In another variant, the method may include the ingress node storing a list of RAN node(s) required by the SMF, and receiving an indication from the SMF when a RAN node should be added or removed from the list.

BRIEF DESCRIPTION OF THE DRAWINGS

For proper understanding of example embodiments, reference should be made to the accompanying drawings, wherein.

DETAILED DESCRIPTION

Figure 1:
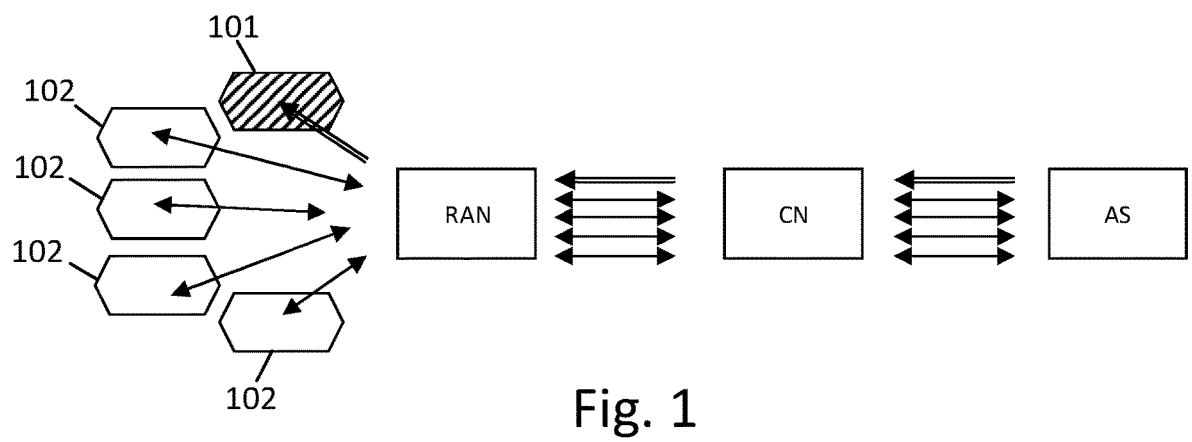
FIG. 1 illustrates an example of content delivery with unicast and MBMS, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for selecting the ingress node for a multicast distribution session, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

The $3^{rd}$ generation partnership project (3GPP) is studying approaches for a multicast and broadcast service for 5G. One proposal is that a UE requests to join a multicast session via signalling related to a protocol data unit (PDU) session. The radio access network (RAN) may then decide whether to send downlink data for that multicast session via unicast (using the PDU session) or multicast, e.g., depending on the UEs in a radio cell. The distribution of the downlink data towards the RAN is performed via a multicast distribution session (also called multicast group) associated with that PDU session. A single such multicast distribution session is used for all users to receive the multicast session. The multicast distribution session distributes the downlink data as its contents from a core node that serves as an ingress point to a public land mobile network's (PLMN's) core network for the typically external source of those contents to the RAN in a tree-like fashion. It may be assumed that the core node that serves as the ingress point is the same session management function (SMF) that also handles the PDU session of the user.

The SMF associated with the user is selected when the PDU session is established, i.e., before the UE indicates whether it desires to join a multicast session and which multicast session it desires to join. As a result, different SMFs may be selected for different UEs within a multicast group. In addition, the ingress point of data to the mobile networks for a multicast session may be negotiated (either via a configuration interface of via commercial agreements) before any UE joins that multicast session. Therefore, a solution is needed at least for how to select the ingress node for a multicast distribution session.

Some embodiments may relate to a solution to allocate the switching between unicast and multicast delivery in RAN and to enhance the PDU session for the support of multicast PDUs transfer between a data network and UEs and thus offer the basic service level. The basic multicast connectivity service meets the requirements for the basic service level and allows the exchange of multicast PDUs between a data network and UEs in a way that does not require a content provider to explicitly request the service from the 3GPP System. In this respect, the basic multicast connectivity service might not different from the (unicast) connectivity service provided by PDU session. However, an efficient delivery of multicast can be achieved by a proper configuration of 5G System that can be accomplished by enhancing PDU session modification procedures as discussed herein.

Enhancements related to the delivery of the same data to UEs include Multimedia Broadcast Multicast Services (MBMS) counting in RAN, MBMS operation on Demand (MooD), and application level signalling (e.g. signalling over GC1 and V1 reference points) of UE's serving cell identity or multicast area identities that are consequently used for MBMS bearer management by an application server (e.g. GC AS or V2X AS).

MooD and the application level signalling may, in principle, be the same because MooD also relies on UE location reporting either as part of consumption reporting or within an HTTP request header. A decision whether to switch between MBMS and unicast delivery is based on cell identities without considering any other aspects of RAN operation. On the other hand, MBMS counting in RAN was an inital enhancement introduced in E-UTRAN to help the multi-cell/multicast coordination entity (MCE) to determine whether to suspend or resume MBMS bearers.

However, a problem with these solutions may be that the change between unicast and MBMS happens end-to-end on per-cell basis while RAN efficiency is the biggest concern and the rest of system is not optimized. The end-to-end switching between unicast and MBMS may also not be optimal from the core network (CN) resource management perspective. For example, considering that a RAN node serves number of cells where in each cell there is at least one UE receiving a service but only in one cell the number of receiving UEs is above a threshold used by an application server (AS) or a MooD proxy to trigger MBMS delivery. The outcome of switching to MBMS delivery for that cell is that the number of content copies delivered through the system is equal to the number of cells. In addition to that, the load of AS may only be partially reduced because the AS must serve unicast request originated from the same RAN node after the switch to MBMS delivery. FIG. 1 illustrates an example of content delivery with unicast and MBMS. As illustrated in the example of FIG. 1, the AS may request delivery via MBMS in the cell 101 while unicast is used to deliver content in other cells 102 because the threshold for switching to MBMS delivery for these cells has not been met. Deployments when a RAN node is serving a considerable number of cells should not be considered uncommon especially considering CU-DU split RAN architecture in 5G.

Figure 2:
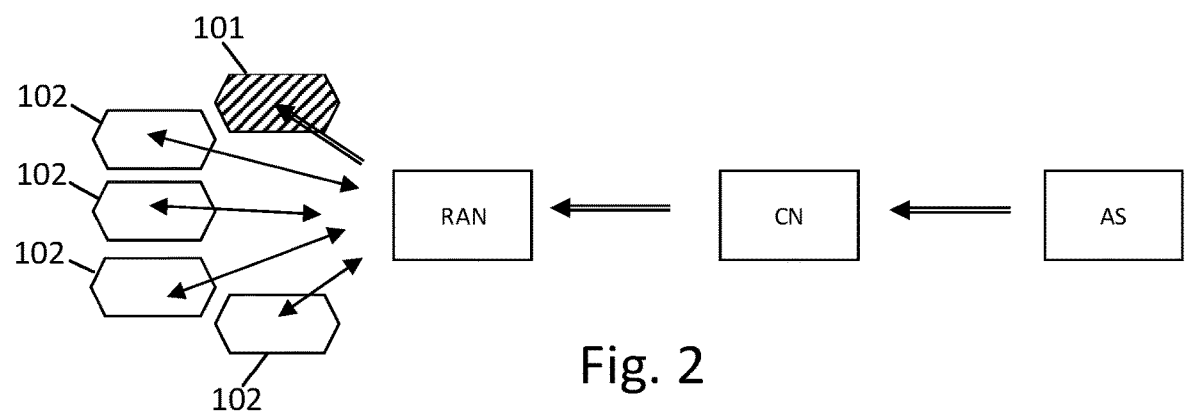
FIG. 2 illustrates an example of multicast content delivery multicast and unicast selection at NG-RAN and AS, according to an embodiment.

FIG. 2 illustrates an example of multicast content delivery multicast and unicast selection at NG-RAN and AS. In the example of FIG. 2, it is assumed that the RAN is aware of users in a multicast group and of data streams to be multicast. The RAN may use this information in addition to any other information available, such as UE's location, cell load, etc. in the second stage when it decides whether a unicast bearer or a point-to-multipoint RAN bearer should be used to deliver the multicast data. FIG. 2 also assumes that multicast content is delivered a single time to the RAN by a multicast distribution session associated with the multicast session. An alternative would be to deliver the content to the RAN via unicast, and the RAN can then detect, e.g., based on a multicast address, that the content can be delivered over the radio via multicast.

Enabling efficient delivery of common content to UEs using multicast capabilities may be thought of as a two stages process. In the first stage, the AS enables multicast delivery, which may include an advertisement of multicast session to UEs (i.e., providing information about multicast group via an application layer signalling) and a transmission of data to the multicast session (i.e., sending multicast packets to the multicast group). As part of NR-RAN and 5GC configuration during the enhanced PDU session update procedure, 5GC is configured to receive multicast packets sent to the multicast group and to deliver multicast packets to the NG-RAN via a tunnel. The tunnel can be a unicast tunnel as specified for MBMS, but multicast tunnelling may also be used. The PDU session modification is performed for each UE that joined the multicast group and therefore the NG-RAN learns about the UEs to which the multicast data shall be delivered. The NG-RAN may use this information, in addition to any other information available such as UE's location, cell load, etc., in the second stage when it decides whether a unicast bearer or a point-to-multipoint RAN bearer should be used to deliver the multicast data. It should be noted that UEs in cells where the content is delivered using point-to-multipoint bearers have always availability to communicate with the AS, for example, for the purpose of a unicast repair.

Figure 3:
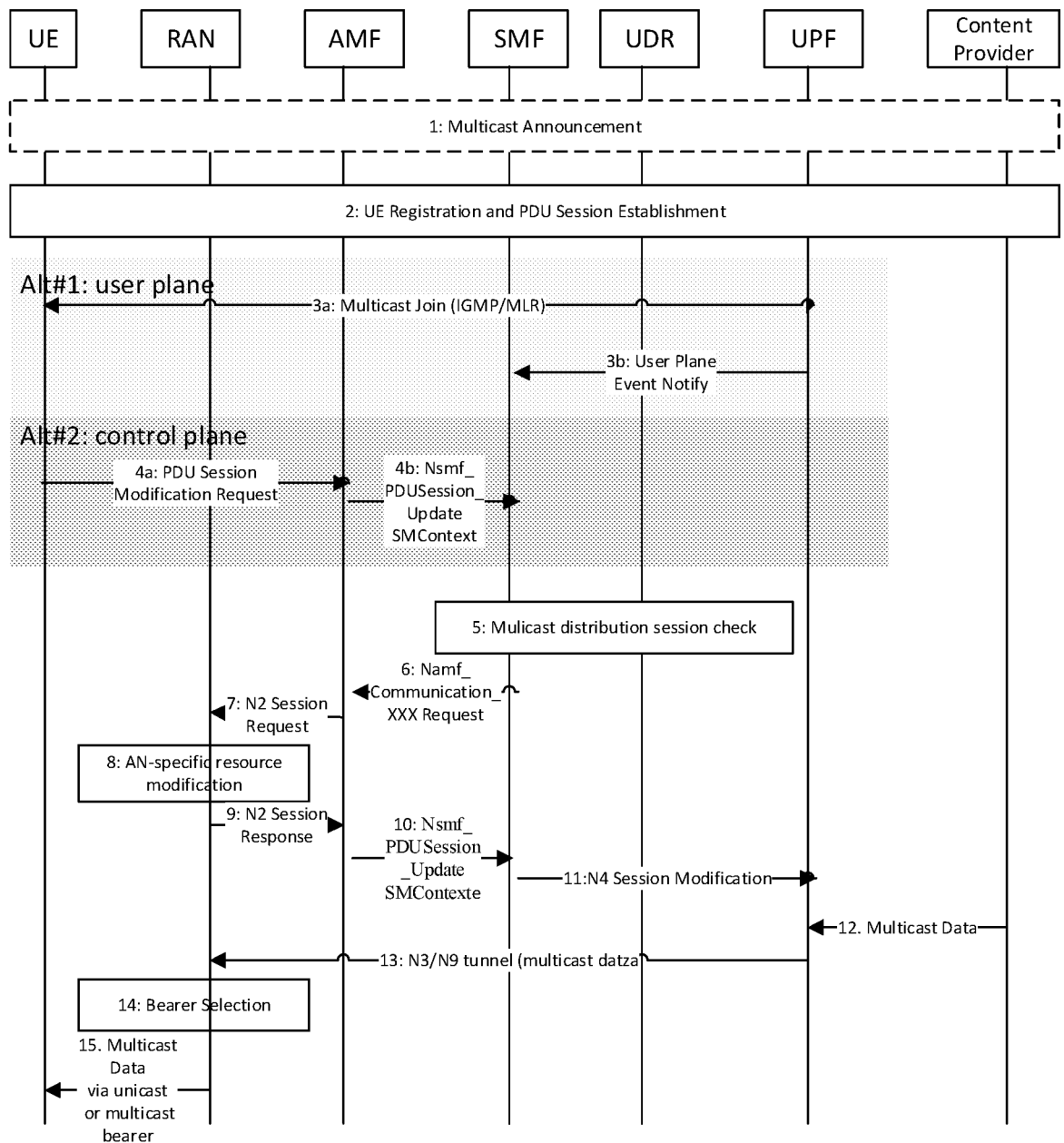
FIG. 3 illustrates an example signaling diagram, according to an embodiment.

FIG. 3 illustrates an example signaling diagram of PDU session modification for multicast, according to an embodiment. As illustrated in the example of FIG. 3, at 1, the content provider may announce the availability of multicast using higher layer (e.g., application layer). The announcement may include at least multicast address of multicast group that the UE can join. The content provider may also send a request to reserve resources for the corresponding multicast session to the network exposure function (NEF) and communicate the related multicast address. If a single ingress point for multicast data is required, the user plane function (UPF) and SMF to handle a multicast distribution session may then be assigned and stored in the user data repository (UDR). If tunnelling is used to transport multicast data in the external network, the transport address at the UPF to receive tunnelled multicast data may be assigned and communicated to the content provider; as an alternative internet protocol (IP) multicast can be used in the external network. The NEF may also store information about the node assigned to handle the multicast distribution in the data base. It is noted that the request to reserve resources for the corresponding multicast session may be optional and can be replaced by configured data based on commercial agreements. If IP multicast is used in the external network, the content provider does not necessarily require information where to send the multicast data.

As further illustrated in the example of FIG. 3, at 2, the UE may register in the PLMN (e.g., see subclause 4.2.2.2 of 3GPP TS 23.502) and request the establishment of a PDU session (e.g., see subclause 4.3.2.2 of 3GPP TS 23.502). The access and mobility management function (AMF) may obtain information from the unified data management (UDM) whether the UE can join multicast sessions as part of the SMF selection subscription data. If so, for direct discovery the AMF may select an SMF capable of handling multicast sessions based on locally configured data or a corresponding SMF capability stored in the network repository function (NRF). For delegated discovery, the AMF may indicate, e.g., within request to establish the PDU session to the service communication proxy (SCP), that support of multicast is required for the selected SMF.

According to alternative 1 for user plane signaling (Alt #1), as illustrated in FIG. 3 at 3a, the UE may join the multicast group and, at 3b, the reception of the join message triggers the UPF, which is a multicast capable router, to notify the SMF. The UPF can be optimized to send the notification when the UE's status in regard to the number of multicast groups the UE has joined changes, i.e., when the UE joins or leaves a group. The SMF may initiate PDU session modification procedure upon the reception of the notification from the UPF.

According to alternative 2 for control plane signaling (Alt #2), as illustrated in FIG. 3 at 4a, the UE may send a PDU session establishment or modification request either upon a request from higher layers or upon a detection by lower layers of the UE joining a multicast group (i.e., detection of IGMP or MLR and detection of the change of content of these messages). The PDU session modification request may include information about the multicast group that the UE wants to join, such as multicast addresses listed in the IGMP and MLR messages. This information may be needed for configuration of UPF with appropriate packet filters. At 4b, the AMF may invoke Nsmf_PDUSession_UpdateSMContext (SM Context ID, N1 SM container (PDU session modification request with the multicast information)).

As also illustrated in the example of FIG. 3, at 5, the SMF may check at the UDR whether a multicast distribution session for the multicast group (address) exists in the system, i.e., whether there is a UE that already joined the multicast group. If the multicast distribution session for the multicast group does not exist, then the SMF may create it when the first UE joins the multicast group and stores in the UDR that it is handling the multicast distribution session. It is noted that, in deployments where a single SMF in a network slice is supporting multicast sessions, the SMF can use local data rather than data stored in the UDR to determine whether multicast distribution session for the multicast group exist. At 6, the SMF may request the AMF to transfer a message to the RAN node indicating that the UE joined the multicast session identified by the multicast address using the Namf_Communication service.

As further illustrated in the example of FIG. 3, at 7, the session modification request may be sent to the RAN. The request may be sent in the UE context using the currently standardized message enhanced with multicast related information, which may include a multicast group identity (e.g., multicast address itself or an identity generated by the SMF that corresponds to the multicast group). The RAN may use the multicast group identity to determine that the session modification procedures of two or more UEs correspond to one multicast group. In other words, the RAN learns what UEs are receiving the same multicast from the multicast group identity. When the RAN receives a session modification request for previously unknown multicast group identity, the RAN may be configured to serve this multicast group. The configuration may include the allocation of downlink tunnel if unicast tunnelling on N3 reference point is used or joining multicast group if multicast tunnelling on N3 is used. At 8, the RAN may perform necessary access network resource modification such as configuration of broadcast bearers.

As also illustrated in the example of FIG. 3, at 9, the RAN may send the session modification response that may include downlink tunnel information. At 10, the AMF may transfer the possible downlink tunnel information received in procedure 6 to the SMF. The SMF may store, e.g., in the UDR, that it requires that the multicast distribution session is distributed towards the RAN node serving the UE and the possible received downlink tunnel information if it did not previously store that information when handling a multicast service request of another UE served by the same RAN node. If another SMF is assigned to handle the multicast distribution session and the UDR has not previously requested that other SMF to send data for that multicast distribution session to that RAN node, the UDR may inform that other SMF. At 11, if the RAN node serving the UE does not yet receive the multicast distribution session, the SMF handling the multicast distribution session may send an N4 session modification request to the UPF including tunnel information if unicast tunnelling is used. It should be noted that the example procedure in the call flow of FIG. 3 shows that the same UPF that send the user plane event notification in procedure 3b, and the same SMF receiving the UE request in procedure 3b or 4b, is also serving the multicast distribution session. However, the information stored in the UDR related to the multicast distribution session allows the system to also support other deployments or configurations.

As further illustrated in the example of FIG. 3, at 12, the UPF may receive multicast PDUs according to the configuration in procedure 11. At 13, the UPF may send multicast PDUs in the N3/N9 tunnel associated to the multicast distribution session to the RAN. There is one tunnel per multicast distribution session and RAN node, i.e., all associated PDU sessions share this tunnel. Then, at 14, the RAN may select multicast or unicast radio bearers to deliver the multicast PDUs to UEs that joined the multicast group and, at 15, the RAN may perform the transmission using the selected bearer.

As introduced above, certain embodiments may provide methods for selecting the ingress node for a multicast distribution session. According to one embodiment, the information on which node serves as an ingress point to a PLMN's core network for a multicast session may be stored in a database or storage. For example, the database may be a subscriber database, such as the unified data management (UDM) or user data repository (UDR), e.g., as depicted in FIG. 3. In an embodiment, when the SMF receives a request to join a multicast session, the SMF may check the database for whether an ingress node for that multicast session has already been assigned and is configured to handle the corresponding multicast distribution session by passing received data towards radio nodes within that multicast distribution session. If no ingress node has previously been assigned, an ingress node may be assigned either by the database and/or SMF and the assigned ingress node may be configured to handle the multicast distribution session. If an ingress node has already been assigned but is not yet configured, the assigned ingress node may be configured (e.g., by the database and/or SMF) to handle the multicast distribution session.

In certain embodiments, the ingress node that is being assigned to handle the multicast distribution session may be the SMF handling the PDU session and/or a separate node. According to an embodiment, when the ingress node is configured to handle the multicast distribution session, the ingress node may configure its user plane handling component (which may be a separate node such as a user plane function (UPF) from the control part of the ingress node in a so-called split architecture) to incoming data for the multicast session (identified, e.g., via an IP address and port, for instance a multicast IP address) towards one of several upstream nodes towards the radio networks, such as UPF(s) controlled by access and mobility management functions (AMFs). In addition, according to certain embodiments, the ingress node may send requests to upstream nodes such as RAN nodes to handle the multicast distribution session and reserve corresponding user plane resources.

In some embodiments, each RAN node (e.g., AMFs) that serves a UE with a PDU session associated with a multicast session should be included in the corresponding multicast distribution session. An identification of those RAN nodes may be stored in the database entry for the multicast session. In an embodiment, an SMF may check, for each multicast session, which RAN node(s) are to receive the multicast distribution sessions (because there are PDU sessions associated with that multicast session and handled by that SMF and RAN node) and may provide a database entry indication for that multicast session indicating the RAN node(s) required by that SMF. In one embodiment, the SMF may update that database entry whenever RAN nodes need to be added or removed. The database may contain separate RAN node lists per SMF. However, the database may provide a combined list of all RAN nodes required by any SMF towards the node configured to handle the multicast distribution session. According to certain embodiments, when a RAN node is added or removed from that combined list, the database may notify the ingress node configured to handle the multicast distribution session, and that ingress node may then update the configuration of its user plane handling component and/or may send a request to an added RAN node to handle the multicast distribution session and/or send a request to a removed RAN node to terminate the handling of that multicast distribution session.

In an additional or alternative embodiment, the lists of RAN nodes per SMF might not be stored in the database but directly stored in the ingress node handling the multicast distribution session. The SMFs may then directly inform that node when SMFs are added or removed.

In some embodiments, the ingress node to handle a multicast distribution session may be assigned when an external application function (AF) sends a request to reserve resources for the corresponding multicast session. In an embodiment, the request of the AF may be handled by a network exposure function (NEF). In this embodiment, the NEF may select a node to handle a multicast distribution session and may send a request to that node to reserve resources to handle that multicast distribution session and possibly to assign an address (e.g., IP address and port) where to receive data for that multicast distribution session. The NEF may also store information about the node assigned to handle the multicast distribution in the database. If the node assigned an address, the NEF may forward that address to the AF.

According to certain embodiments, in the database entry and signalling (e.g., the request of the UE related to a PDU session to join a multicast session, the signalling from SMF towards NAN nodes to establish the multicast distribution session, the signalling between AF and NEF, and the signalling between NEF and node handling a multicast distribution session), the multicast session may be identified by an internet protocol (IP) multicast address.

Figure 4A:
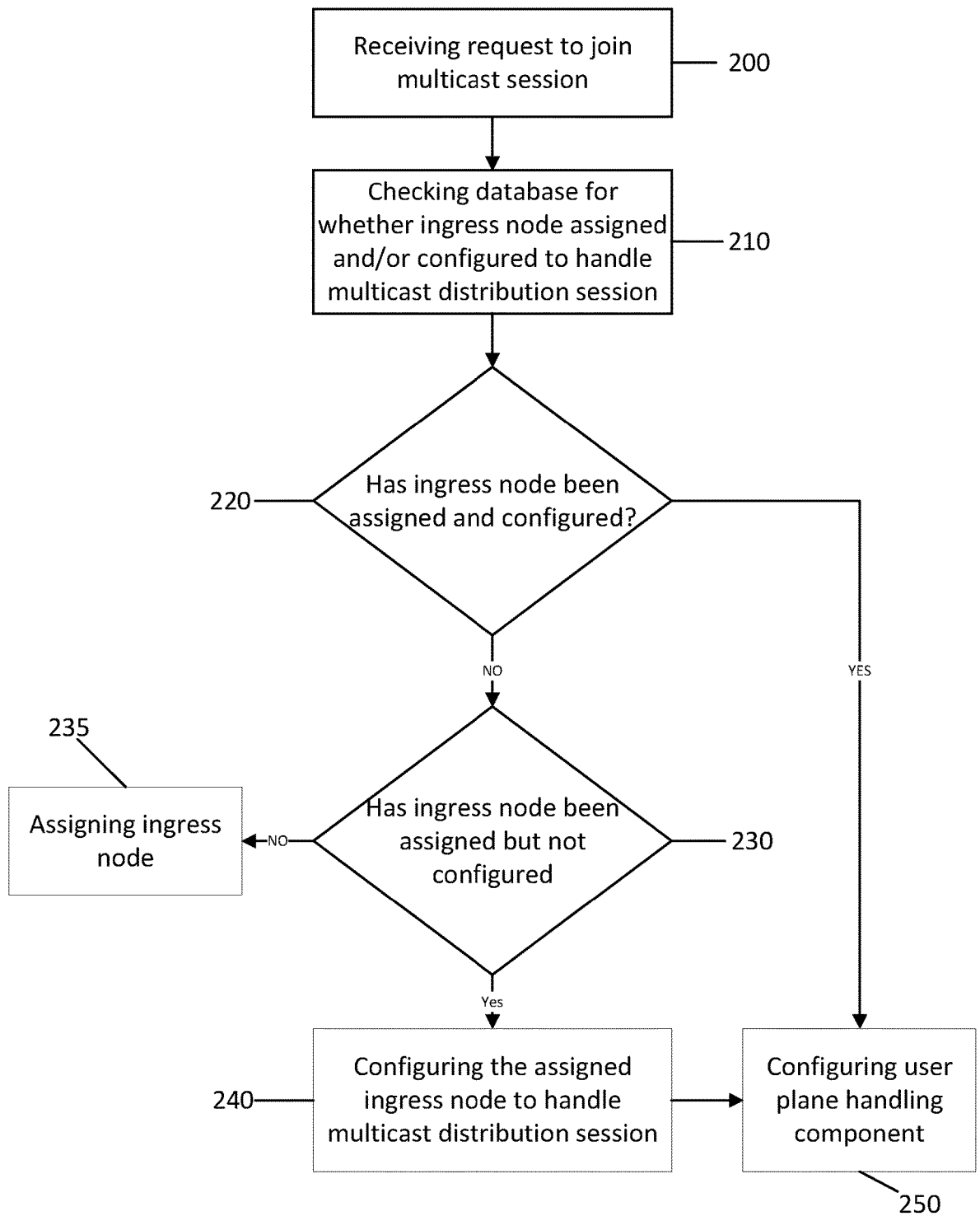
FIG. 4a illustrates an example flow diagram of a method, according to an embodiment.

FIG. 4a illustrates an example flow diagram of a method for selecting an ingress node for multicast distribution session(s), according to one example embodiment. In certain example embodiments, the flow diagram of FIG. 4a may be performed by a network entity or network node associated with a communication system, such as LTE or 5G NR. For instance, in some example embodiments, the network node performing the method of FIG. 4a may include a base station, eNB, gNB, and/or NG-RAN node. In an example embodiment, the method of FIG. 4a may be performed by an SMF, such as the SMF illustrated in FIG. 3, or any of the other nodes depicted therein.

As illustrated in the example of FIG. 4a, the method may include, at 200, receiving a request to join a multicast session. The method may then include, at 210, checking a database to determine whether an ingress node for the multicast session has already been assigned and/or configured to handle the corresponding multicast distribution session by passing received data towards radio nodes within the multicast distribution session. According to certain embodiments, in the database entry and signalling, a multicast session may be identified by an IP multicast address. At 220, it is determined whether an ingress node has been assigned and configured for the multicast session and, if it is determined that an ingress node has been both assigned and configured then, at 250, the ingress node may configure its user plane handling component for incoming data for the multicast session to one or more upstream nodes towards the radio networks. In certain embodiments, the user plane handling component may be a separate node such as a user plane function (UPF) from the control part of the ingress node in a so-called split architecture. In an embodiment, the multicast session may be identified, for example, via an IP address and port, such as a multicast IP address.

Continuing with the example of FIG. 4a, if it is determined, at 220, that an ingress node has not been both assigned and configured, then at 230, it is determined whether an ingress node has been assigned but not configured. If it is determined that an ingress node has been assigned but not configured, then the assigned ingress node may be configured, at 240, to handle the multicast distribution session. If it is determined that an ingress node has not been assigned or configured, then at 235 an ingress node may be assigned and, at 240, the assigned ingress node may be configured to handle the multicast distribution session. Once an ingress node is assigned and configured, the method may proceed, at 250, where the ingress node may configure its user plane handling component for incoming data for the multicast session to one or more upstream nodes towards the radio networks.

According to certain embodiments, the method may include sending requests to upstream nodes such as RAN nodes to handle the multicast distribution session and reserve corresponding user plane resources. In some embodiments, each RAN node that serves a UE with a PDU session associated with a multicast session should be included in the corresponding multicast distribution session. An identification of those RAN nodes may be stored in the database entry for the multicast session. In an embodiment, the method may include the SMF checking, for each multicast session, which RAN node(s) are to receive the multicast distribution sessions and providing a database entry indication for that multicast session indicating the RAN node(s) required by the SMF. In one embodiment, the method may include updating that database entry when RAN nodes need to be added or removed. According to certain embodiments, the database may contain separate RAN node lists per SMF. However, the database may provide a combined list of all RAN nodes required by any SMF towards the node configured to handle the multicast distribution session. According to some embodiments, when a RAN node is added or removed from the combined list, the method may include receiving a notification, from the database, of the change and updating the configuration of the user plane handling component and/or sending a request to an added RAN node to handle the multicast distribution session and/or sending a request to a removed RAN node to terminate the handling of that multicast distribution session.

In an additional or alternative embodiment, the lists of RAN nodes per SMF may be directly stored in the ingress node handling the multicast distribution session. In this embodiment, the method may include directly informing that node when SMFs are added or removed.

In some embodiments, the method may include assigning the ingress node to handle a multicast distribution session when an external AF sends a request to reserve resources for the corresponding multicast session. In an embodiment, the request of the AF may be handled by a network exposure function (NEF). In this embodiment, the NEF may select a node to handle a multicast distribution session and may send a request to that node to reserve resources to handle that multicast distribution session and possibly to assign an address (e.g., IP address and port) where to receive data for that multicast distribution session. The NEF may also store information about the node assigned to handle the multicast distribution in the database. If the node assigned an address, the NEF may forward that address to the AF.

Figure 4B:
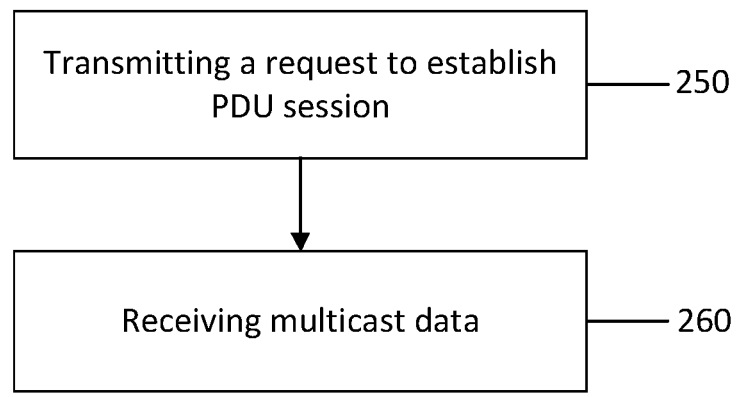
FIG. 4b illustrates an example flow diagram of a method, according to an embodiment.

FIG. 4b illustrates an example flow diagram of a method related to selecting an ingress node for multicast distribution session(s), according to one example embodiment. In certain example embodiments, the flow diagram of FIG. 4b may be performed by a network entity or network node associated with a communications system, such as LTE or 5G NR. For instance, in some example embodiments, the network entity performing the method of FIG. 4b may be a UE, mobile station, IoT device, or the like. In one example embodiment, the method of FIG. 4b may be performed by the UE illustrated in FIG. 3, for instance.

As illustrated in the example of FIG. 4b, the method may include, at 250, transmitting a request to establish a PDU session to a network node, such as an AMF. In an embodiment, the request may optionally include an indication as to whether the UE is capable of handling multicast sessions. The method may also include, at 260, receiving multicast PDU(s), for example, via unicast or multicast bearer.

Figure 5A:
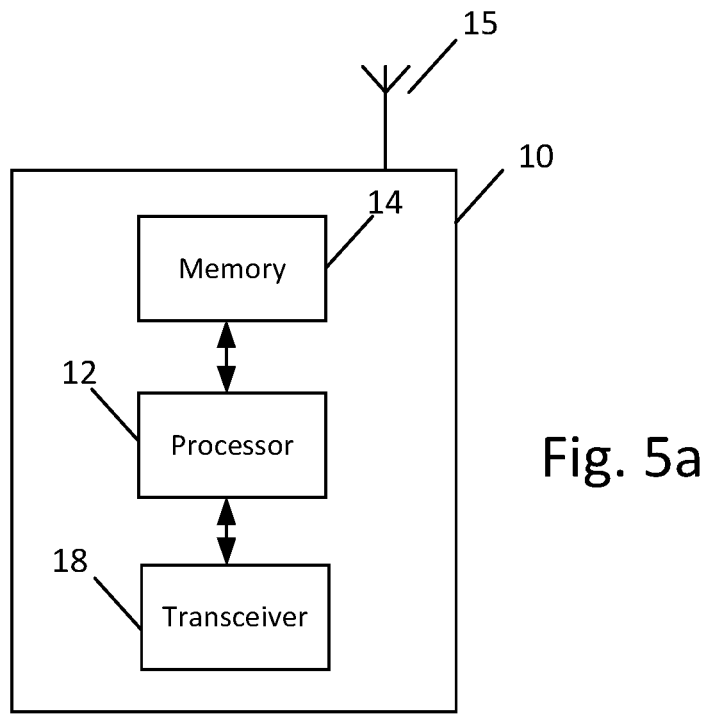
FIG. 5a illustrates an example block diagram of an apparatus, according to an embodiment.

FIG. 5a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be or may include a NG-RAN node, an eNB in LTE, gNB in 5G, AMF or SMF. For instance, in one embodiment, apparatus 10 may correspond to the SMF illustrated in FIG. 3.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (for example, digital-to-analog converters and the like), mappers, a Fast Fourier Transform (FFT) module, and/or the like, e.g., to generate symbols for transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, AMF, SMF, or the like. For example, in some embodiments, apparatus 10 may be configured to perform one or more of the processes depicted in any of the flow charts or signaling diagrams described herein, such as those illustrated in FIG. 1, FIG. 2, FIG. 3, FIG. 4a and/or FIG. 4b. In some embodiments, as discussed herein, apparatus 10 may be configured to perform a procedure relating to selecting ingress node(s) for handling multicast distribution session(s).

According to this embodiment, apparatus 10 may be controlled by memory 14 and processor 12 to receive a request to join a multicast session. In an embodiment, apparatus 10 may be controlled by memory 14 and processor 12 to check a database to determine whether an ingress node for the multicast session has already been assigned and/or configured to handle the corresponding multicast distribution session by passing received data towards radio nodes within the multicast distribution session. If it is determined that an ingress node has been both assigned and configured, apparatus 10 may be controlled by memory 14 and processor 12 to configure its user plane handling component for incoming data for the multicast session to one or more upstream nodes towards the radio networks. If it is determined that an ingress node has not been both assigned and configured, apparatus 10 may be controlled by memory 14 and processor 12 to determine whether an ingress node has been assigned but not configured. If it is determined that an ingress node has been assigned but not configured, apparatus 10 may be controlled by memory 14 and processor 12 to configure the assigned ingress node may to handle the multicast distribution session. If it is determined that an ingress node has not been assigned or configured, apparatus 10 may be controlled by memory 14 and processor 12 to assign an ingress node and to configure the assigned ingress node to handle the multicast distribution session. Once an ingress node is assigned and configured, apparatus 10 may be controlled by memory 14 and processor 12 to configure its user plane handling component for incoming data for the multicast session to one or more upstream nodes towards the radio networks.

According to certain embodiments, apparatus 10 may be controlled by memory 14 and processor 12 to send requests to upstream nodes such as RAN nodes to handle the multicast distribution session and reserve corresponding user plane resources. In some embodiments, each RAN node that serves a UE with a PDU session associated with a multicast session should be included in the corresponding multicast distribution session, and an identification of those RAN nodes may be stored in the database entry for the multicast session. In an embodiment, apparatus 10 may be controlled by memory 14 and processor 12 to check, for each multicast session, which RAN node(s) are to receive the multicast distribution sessions and to provide a database entry indication for that multicast session indicating the RAN node(s) required by the apparatus 10. In one embodiment, apparatus 10 may be controlled by memory 14 and processor 12 to update that database entry when RAN nodes need to be added or removed. According to certain embodiments, the database may contain separate RAN node lists per SMF. However, the database may provide a combined list of all RAN nodes required by any SMF towards the node configured to handle the multicast distribution session. According to some embodiments, when a RAN node is added or removed from the combined list, apparatus 10 may be controlled by memory 14 and processor 12 to receive a notification, from the database, of the change and to update the configuration of the user plane handling component and/or to send a request to an added RAN node to handle the multicast distribution session and/or to send a request to a removed RAN node to terminate the handling of that multicast distribution session.

In an additional or alternative embodiment, the lists of RAN nodes per SMF may be directly stored in the apparatus 10 or the ingress node handling the multicast distribution session. In this embodiment, apparatus 10 may be controlled by memory 14 and processor 12 to directly inform that node when SMFs are added or removed.

In some embodiments, apparatus 10 may be controlled by memory 14 and processor 12 to assign the ingress node to handle a multicast distribution session when an external AF sends a request to reserve resources for the corresponding multicast session. In an embodiment, the request of the AF may be handled by a network exposure function (NEF). In this embodiment, the NEF may select a node to handle a multicast distribution session and may send a request to that node to reserve resources to handle that multicast distribution session and possibly to assign an address (e.g., IP address and port) where to receive data for that multicast distribution session. The NEF may also store information about the node assigned to handle the multicast distribution in the database. If the node assigned an address, the NEF may forward that address to the AF.

Figure 5B:
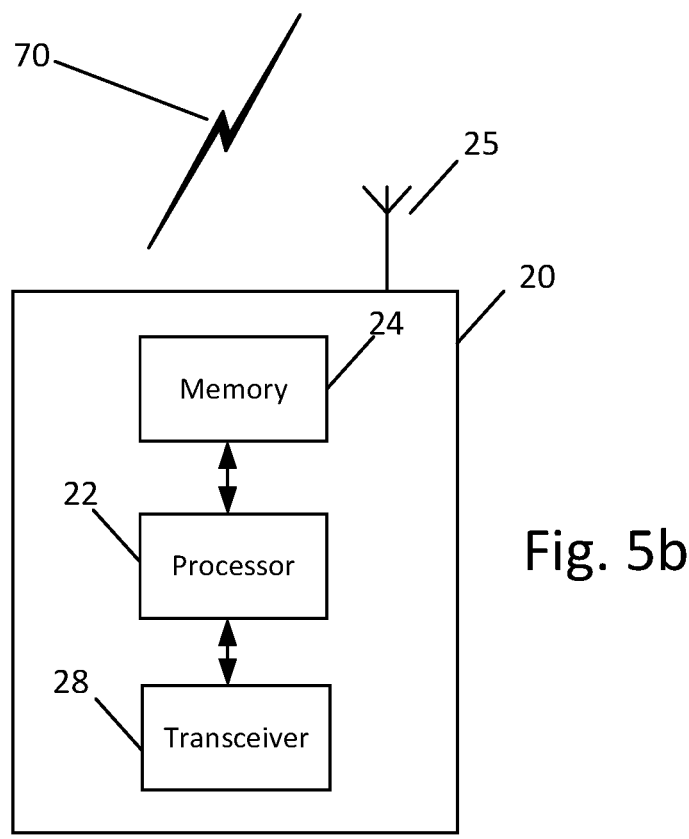
FIG. 5b illustrates an example block diagram of an apparatus, according to an embodiment.

FIG. 5b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other example embodiments. For example, it should be understood that, in certain embodiments, apparatus 20 may include two or more processors that may form a multiprocessor system (e.g., in this case processor 22 may represent a multiprocessor) that may support multiprocessing. In some embodiments, the multiprocessor system may be tightly coupled or loosely coupled (e.g., to form a computer cluster).

Processor 22 may perform functions associated with the operation of apparatus 20 including, as some non-limiting examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and/or for transmitting via an uplink from apparatus 20. According to certain embodiments, apparatus 20 may further include a transceiver 28 configured to transmit and receive information. In one example, the transceiver 28 may also include a radio interface (e.g., a modem) coupled to the antenna 25. In some embodiments, the radio interface may correspond to a plurality of radio access technologies including one or more of GSM, LTE, LTE-A, 5G, NR, WLAN, NB-IoT, Bluetooth, BT-LE, NFC, RFID, UWB, and the like. In further example embodiments, the radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22.

The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and/or memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, FIG. 2, FIG. 3, FIG. 4*a* and/or FIG. 4*b*. In certain embodiments, apparatus 20 may include or represent a UE and may be configured to perform a procedure relating to multicast sessions, for instance.

In certain embodiments, apparatus 20 may be controlled by memory 24 and processor 22 to transmit a request to establish a PDU session to a network node, such as an AMF. In an embodiment, the request may optionally include an indication as to whether the UE is capable of handling multicast sessions. According to an embodiment, apparatus 20 may be controlled by memory 24 and processor 22 to receive multicast PDU(s), for example, via unicast or multicast bearer.

Therefore, certain example embodiments provide several technological improvements, enhancements, and/or advantages over existing technological processes and constitute an improvement at least to the technological field of wireless network control and management. For example, certain embodiments provide a mechanism for selecting an ingress node for multicast distribution session(s). Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

A first embodiment is directed to a method that may include receiving a request to join a multicast session. The method may also include checking a database to determine whether an ingress node for the multicast session has already been assigned and/or configured to handle the corresponding multicast distribution session by passing received data towards radio nodes within the multicast distribution session.

In a variant, when it is determined that an ingress node has been assigned and configured, the method may include configuring a user plane handling component of the assigned ingress node for incoming data for the multicast session to one or more upstream nodes towards the radio networks. In certain embodiments, the user plane handling component may be a separate node such as a user plane function (UPF) from the control part of the ingress node in a so-called split architecture.

According to a variant, if it is determined that an ingress node has been assigned but not configured, then the assigned ingress node may be configured to handle the multicast distribution session.

In a variant, if it is determined that an ingress node has not been assigned or configured, then an ingress node may be assigned and the assigned ingress node may be configured to handle the multicast distribution session.

According to a variant, once an ingress node is assigned and configured, the ingress node may configure its user plane handling component for incoming data for the multicast session to one or more upstream nodes towards the radio networks.

In a variant, the multicast session may be identified, for example, via an IP address and port, such as a multicast IP address.

According to a variant, the method may include sending requests to upstream nodes such, as RAN nodes, to handle the multicast distribution session and reserve corresponding user plane resources.

In a variant, the method may include checking, for each multicast session, which RAN node(s) are to receive the multicast distribution sessions and providing a database entry indication for that multicast session indicating the RAN node(s) required.

In a variant, the method may include updating the database entry when RAN node(s) need to be added or removed. According to certain variants, the RAN node(s) may include AMF(s).

In another variant, the lists of RAN nodes per SMF may be directly stored in the ingress node handling the multicast distribution session. In this embodiment, the method may include directly informing that node when SMFs are added or removed.

In some variants, the method may include assigning the ingress node to handle a multicast distribution session when an external AF sends a request to reserve resources for the corresponding multicast session. In a variant, the request of the AF may be handled by a network exposure function (NEF). In this variant, the NEF may select a node to handle a multicast distribution session and may send a request to that node to reserve resources to handle that multicast distribution session and possibly to assign an address (e.g., IP address and port) where to receive data for that multicast distribution session. In a variant, the NEF may also store information about the node assigned to handle the multicast distribution in the database. According to a variant, if the node assigned an address, the NEF may forward that address to the AF.

A second embodiment is directed to a method that may include storing, at a database, information on which node(s) serve as ingress point to PLMN's core network for a multicast session. The method may also include, for example responsive to a request to join the multicast session received by an SMF, providing information to the SMF whether an ingress node has been assigned and configured to handle the multicast session.

In a variant, the method may also include storing, along with the information on which nodes serve as ingress nodes for multicast sessions, information on the RAN node(s) that should receive the multicast session.

According to a variant, the method may also include receiving, at the database, an indication from the SMF of the RAN node(s) required by the SMF for the multicast session and optionally receiving updates when a RAN node needs to be added or removed.

In a variant, the method may also include storing separate RAN node lists per SMF and/or optionally storing a combined list of all RAN node(s) required by any SMF towards the ingress node configured to handle the multicast session.

According to a variant, the method may include providing the combined list of RAN node(s) required by an SMF to the ingress node configured to handle the multicast session and, when a RAN node is added or removed from the combined list, notifying the ingress node of the change to the combined list.

In one variant, the database may be a UDR or UDM, for example.

A third embodiment is directed to a method that may include receiving, by an ingress node, a configuration to handle a multicast distribution session. The method may also include the ingress node configuring its user plane handling component for incoming data for the multicast distribution session to one or more upstream nodes towards the radio networks.

In one variant, the user plane handling component may be a separate node, such as a UPF, from the control part of the ingress node. According to a variant, the upstream node(s) may include, RAN node(s) such as UPF(s) controlled by AMFs.

According to a variant, the method may include transmitting requests to the upstream node(s) (e.g., RAN node(s)) to handle the multicast distribution session and reserve corresponding user plane resources.

In a variant, the method may include assigning an address (e.g., IP address and/or port) for where to receive data for the multicast distribution session.

According to a variant, the method may include receiving the combined list of RAN node(s) required by an SMF from a database.

According to some variants, when a RAN node is added or removed from the combined list, the method may include receiving a notification, from the database, of the change and optionally updating the configuration of the user plane handling component and/or sending a request to an added RAN node to handle the multicast distribution session and/or sending a request to a removed RAN node to terminate the handling of that multicast distribution session.

In another variant, the method may include the ingress node storing a list of RAN node(s) required by the SMF, and receiving an indication from the SMF when a RAN node should be added or removed from the list.

A fourth embodiment is directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, and/or any other embodiments discussed herein, or any of the variants described above.

A fifth embodiment is directed to an apparatus that may include circuitry configured to perform the method according to the first embodiment, the second embodiment, the third embodiment, and/or any other embodiments discussed herein, or any of the variants described above.

A sixth embodiment is directed to an apparatus that may include means for performing the method according to the first embodiment, the second embodiment, the third embodiment, and/or any other embodiments discussed herein, or any of the variants described above.

A seventh embodiment is directed to a non-transitory computer readable medium comprising program instructions stored thereon for performing at least the method according to the first embodiment, the second embodiment, the third embodiment, and/or any other embodiments discussed herein, or any of the variants described above.

I claim:

1. A method comprising:
receiving a request to join a multicast session;
checking a database to determine whether an ingress node for the multicast session has already been assigned or configured to handle a corresponding multicast distribution session; and
based on determining that an ingress node has not been assigned or configured
assigning an ingress node and configuring the assigned ingress node to handle the multicast distribution session,
wherein session management functions (SMF) are directly stored in the ingress node handling the multicast distribution session, and wherein the method further comprises informing the ingress node when SMFs are added or removed.

2. The method according to claim 1, further comprising sending requests to radio access network nodes to handle the multicast distribution session and reserve corresponding user plane resources.

3. An apparatus, comprising:
at least one processor; and
at least one memory comprising computer program code, which, when executed by the at least one processor, to cause causes the apparatus at least to:
receive a request to join a multicast session;
check a database to determine whether an ingress node for the multicast session has already been at least one of assigned or configured to handle a corresponding multicast distribution session; and
after determining that an ingress node has not been assigned or configured, assign an ingress node and configuring the assigned ingress node to handle the multicast distribution session,
wherein session management functions (SMF) are directly stored in the ingress node handling the multicast distribution session, and wherein the computer program code, when executed by the at least one processor, further causes the apparatus to inform the ingress node when SMFs are added or removed.

4. The apparatus according to claim 3, wherein the computer program code when executed by the at least one processor, further causes the apparatus at least to send requests to radio access network nodes to handle the multicast distribution session and reserve corresponding user plane resources.

5. A method comprising:
receiving, by an ingress node, a configuration to handle a multicast distribution session, wherein session management functions (SMF) are directly stored in the ingress node handling the multicast distribution session;
configuring, by the ingress node, its user plane handling component for incoming data for the multicast distribution session to one or more upstream nodes towards at least one radio network; and
receiving, by the ingress node, an indication of when SMFs are added or removed.

6. The method according to claim 5, wherein the user plane handling component is a separate node from a control part of the ingress node.

7. The method according to claim 5, wherein the one or more upstream nodes comprise at least one of radio access network (RAN) nodes or user plane functions (UPFs) controlled by access and mobility management functions (AMFs).

8. The method according to claim 5, further comprising:
assigning an address for where to receive data for the multicast distribution session.

9. An apparatus, comprising:
at least one processor; and
at least one memory comprising computer program code, which, when executed by the at least one processor, causes the apparatus at least to:
receive a configuration to handle a multicast distribution session, wherein session management functions (SMF) are directly stored in the ingress node handling the multicast distribution session;
configure user plane handling component of the apparatus for incoming data for the multicast distribution session to one or more upstream nodes towards at least one radio network; and
receive an indication of when SMFs are added or removed.

10. The apparatus according to claim 9, wherein the user plane handling component is a separate node from a control part of the apparatus.

11. The apparatus according to claim 9, wherein the one or more upstream nodes comprise at least one of radio access network (RAN) nodes or user plane functions (UPFs) controlled by access and mobility management functions (AMFs).

12. The apparatus according to claim 9, wherein the computer program code when executed by the at least one processor, further causes the apparatus at least to:
assign an address for where to receive data for the multicast distribution session.

* * * * *